United States Patent
Childs et al.

(10) Patent No.: US 10,244,281 B2
(45) Date of Patent: Mar. 26, 2019

(54) APPENDING PLAYBACK FROM MULTIPLE SOURCE DEVICES TO THE SAME MEDIA STREAM

(71) Applicant: Lenovo (Singapore) Pte. Ltd., Singpaore (SG)

(72) Inventors: Philip Lee Childs, Durham, NC (US); Michael Terrell Vanover, Raleigh, NC (US); Hui Wang, Beijing (CN); Shaowei Chen, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 452 days.

(21) Appl. No.: 13/690,226

(22) Filed: Nov. 30, 2012

(65) Prior Publication Data
US 2014/0156781 A1 Jun. 5, 2014

(51) Int. Cl.
H04N 21/00 (2011.01)
H04L 29/06 (2006.01)
H04N 21/436 (2011.01)
H04N 21/482 (2011.01)

(52) U.S. Cl.
CPC ....... H04N 21/43615 (2013.01); H04L 29/06 (2013.01); H04N 21/4825 (2013.01)

(58) Field of Classification Search
None
See application file for complete search history.

(56) References Cited

U.S. PATENT DOCUMENTS

| | | | |
|---|---|---|---|
| 7,783,703 B2* | 8/2010 | Rafey | G06F 17/30056 709/203 |
| 8,799,249 B2* | 8/2014 | Martinez | 707/705 |
| 8,880,714 B2* | 11/2014 | Collart et al. | 709/229 |
| 9,015,588 B2* | 4/2015 | Cassidy | H04L 47/36 715/704 |
| 9,374,607 B2* | 6/2016 | Bates | H04N 21/25816 |
| 9,436,929 B2* | 9/2016 | Oliver | G06F 17/30772 |
| 2006/0015904 A1* | 1/2006 | Marcus | G11B 27/034 725/46 |
| 2009/0099919 A1* | 4/2009 | Schultheiss | G06Q 10/00 705/14.1 |
| 2011/0004330 A1* | 1/2011 | Rothkopf | G11B 27/105 700/94 |
| 2012/0117183 A1* | 5/2012 | Wong et al. | 709/217 |
| 2012/0117586 A1* | 5/2012 | McCoy et al. | 725/25 |
| 2012/0117588 A1* | 5/2012 | McCoy et al. | 725/28 |
| 2012/0210241 A1* | 8/2012 | Wong et al. | 715/739 |
| 2013/0007208 A1* | 1/2013 | Tsui | G06F 17/30017 709/217 |
| 2013/0198392 A1* | 8/2013 | Hymel | G06F 3/013 709/227 |

(Continued)

*Primary Examiner* — Shirley X Zhang
(74) *Attorney, Agent, or Firm* — Ference & Associates LLC

(57) ABSTRACT

An aspect provides a method, including: receiving a play request at a first user device, the received play request being transmitted from at least one other user device; determining if a media file is currently being played at the first user device; and responsive to determining that a media file is currently being played at the first user device, appending, at the first user device, a media file associated with the received play request to a media play queue of the first user device. Other aspects are described and claimed.

20 Claims, 4 Drawing Sheets

(56) References Cited

U.S. PATENT DOCUMENTS

| | | | |
|---|---|---|---|
| 2013/0343567 A1* | 12/2013 | Triplett | H04N 21/41407 381/77 |
| 2013/0346859 A1* | 12/2013 | Bates | H04N 21/25816 715/716 |
| 2013/0347044 A1* | 12/2013 | Lee et al. | 725/88 |
| 2014/0052770 A1* | 2/2014 | Gran | H04N 21/26258 709/203 |
| 2014/0074924 A1* | 3/2014 | Yim | H04N 21/43637 709/204 |
| 2014/0075583 A1* | 3/2014 | Martin et al. | 726/31 |
| 2014/0094943 A1* | 4/2014 | Bates | H04N 21/00 700/94 |

* cited by examiner

APPENDING PLAYBACK FROM MULTIPLE SOURCE DEVICES TO THE SAME MEDIA STREAM

BACKGROUND

Information handling devices ("devices"), for example cell phones, smart phones, tablet devices, laptop and desktop computers, televisions or flat panel display devices with built in processing and logic circuitry, etc., may be used to view or otherwise consume media data, for example video files and audio files. Managing and controlling the various user devices that may be employed in a use experience is challenging due to the growing ability of user devices to communicate with one another and to cooperate in data handling tasks.

Media data consumption is a common use context where remote control of one or more user devices may be desirable. Conventionally, control of media file play on user devices has been limited to simple arrangements for direct management of a currently playing media file and do not offer flexibility in controlling media playback lists or queues, particularly in multi-device scenarios.

BRIEF SUMMARY

In summary, one aspect provides a method, comprising: receiving a play request at a first user device, the received play request being transmitted from at least one other user device; determining if a media file is currently being played at the first user device; and responsive to determining that a media file is currently being played at the first user device, appending, at the first user device, a media file associated with the received play request to a media play queue of the first user device.

Another aspect provides an information handling device, comprising: one or more processors; and a memory in operative connection with the one or more processors that stores instructions executable by the one or more processors to perform acts comprising: receiving a play request at the information handling device, the received play request being transmitted from at least one other user device; determining if a media file is currently being played at the information handling device; and responsive to determining that a media file is currently being played at the information handling device, appending, at the information handling device, a media file associated with the received play request to a media play queue of the information handling device.

A further aspect provides a program product, comprising: a storage medium having computer program code embodied therewith, the computer program code comprising: computer program code configured to receive a play request at a first user device, the received play request being transmitted from at least one other user device; computer program code configured to determine if a media file is currently being played at the first user device; and computer program code configured to, responsive to determining that a media file is currently being played at the first user device, append, at the first user device, a media file associated with the received play request to a media play queue of the first user device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
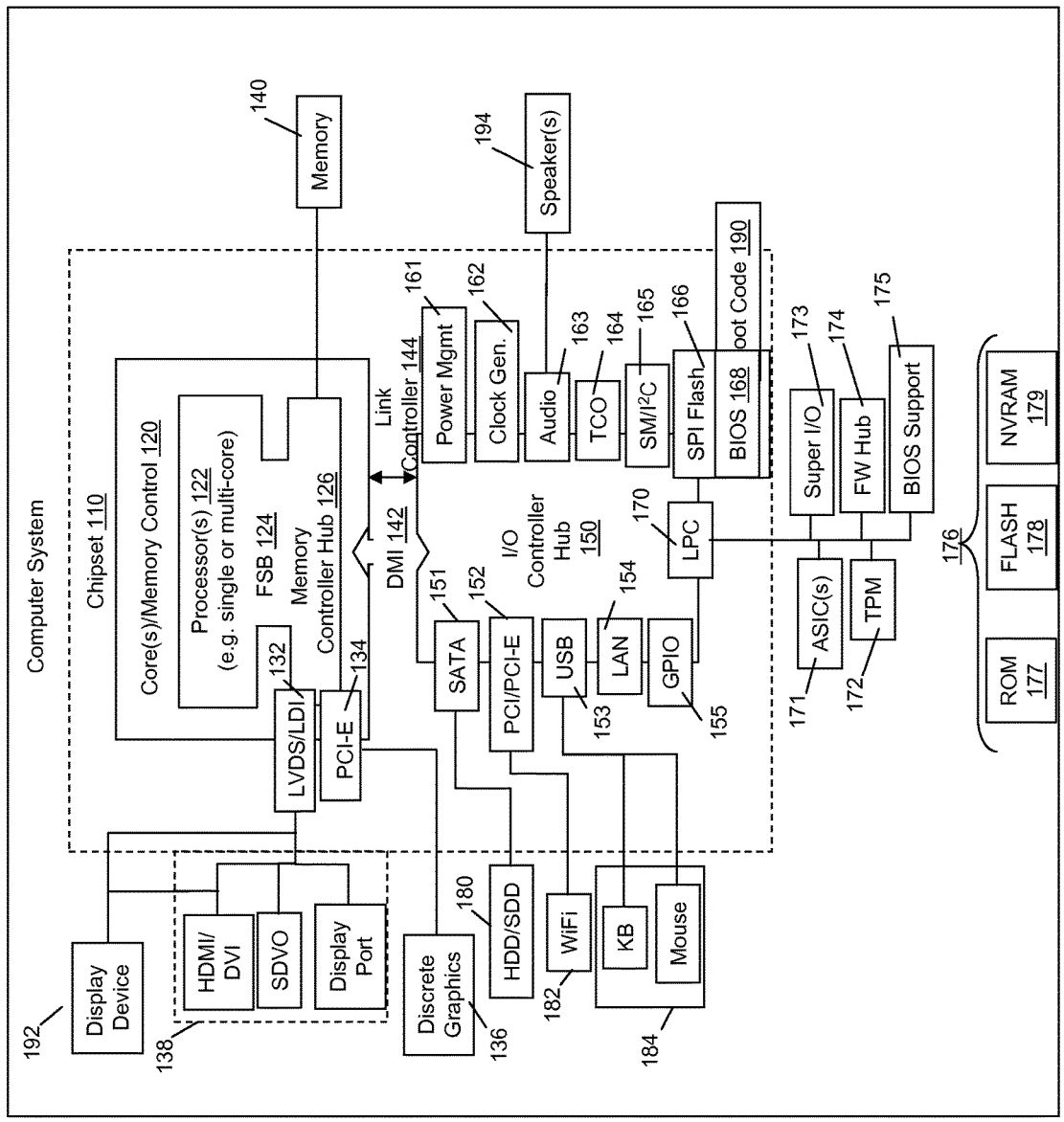
FIG. 1 illustrates an example information handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Co-pending and commonly assigned U.S. patent application Ser. No. 13/690,169, entitled "MULTIPLE DEVICE MEDIA PLAYBACK", filed herewith, the contents of which are incorporated by reference herein, includes a description of embodiments allowing a first user device (controller user device) to select media data of a second user device (media source) and send the media data to a third user device (destination device) for playback.

In controlling media file playback, conventional arrangements do not permit flexible management of media file play and queue management. For example, using conventional arrangements, if a first user device is playing a media file and receives a request to play a second media file, e.g., from a second user device, the first user device will immediately stop play of the first media file and begin playing the second media file. This difficulty may be compounded in multiple device media playback scenarios wherein many user devices may issue media play instructions to a target or destination device (i.e., the user device playing the media).

Accordingly, an embodiment provides for flexible management of the play queue or playlist on such devices and in such multi-device scenarios. An embodiment provides a mechanism in which a new play request, e.g., received by a first user device from a second user device, is appended to a playback list or play queue of the media stream such that the currently playing media file remains uninterrupted. An embodiment provides for alternative mechanisms, for example an override capability, for situations where immediate play of a subsequent media file is desirable.

The illustrated example embodiments will be best understood by reference to the figures. The following description is intended only by way of example, and simply illustrates certain example embodiments.

Figure 2:
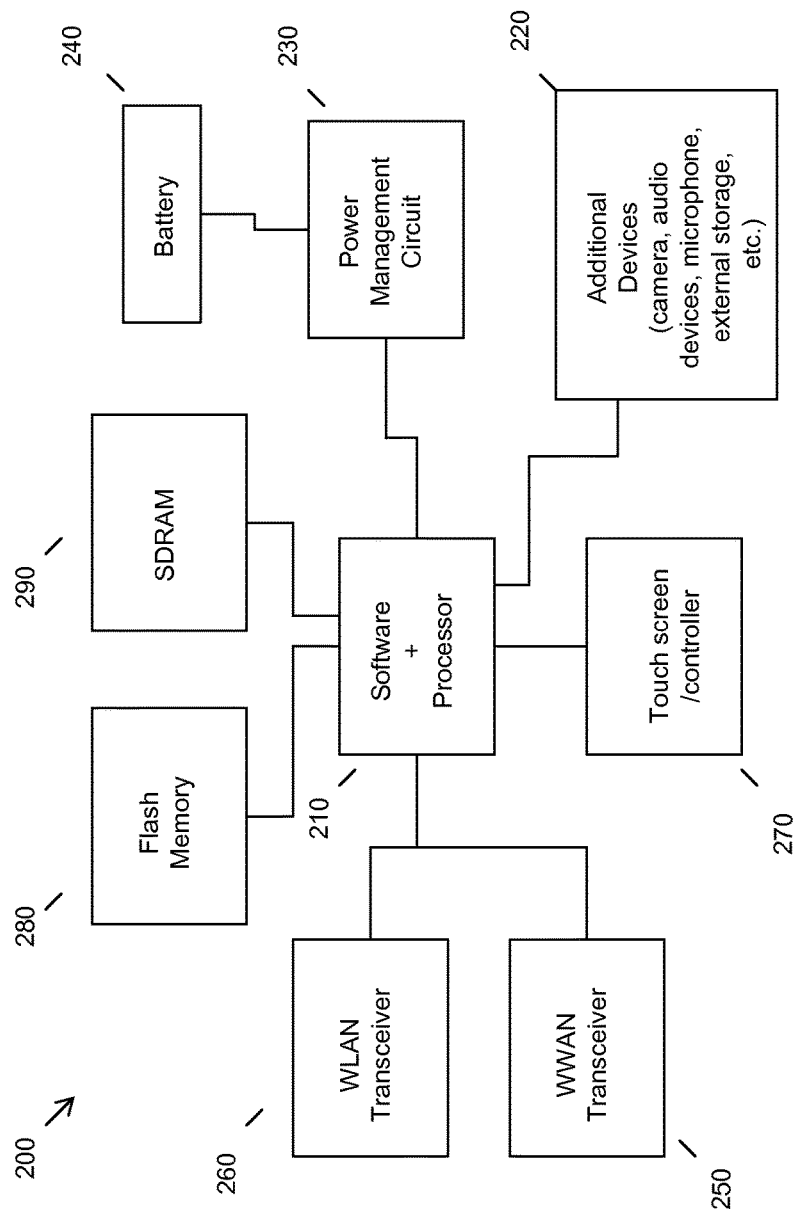
FIG. 2 illustrates another example information handling device and components thereof.

Referring to FIG. 1 and FIG. 2, while various other circuits, circuitry or components may be utilized, with regard to smart phone and/or tablet circuitry 200, an example illustrated in FIG. 2 includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1 and FIG. 2, may include various user devices, e.g., a first user device (sending a media play request and/or associated media file), a second user device (e.g., receiving the media play request and/or the associated media file), a third user device (e.g., another user device that sends media play requests and/or a related media file), as well as other devices, such as remote cloud computing devices. For example, FIG. 1 may be a first or second user device, such as a laptop or desktop computing device or the like, or may be a cloud computing device. Similarly, FIG. 2 may be a first or second user device. The devices may communicate with one another via various means, as further described herein. Thus, a user may use different user devices to append play requests to a media stream of currently playing media at a user device, as described herein.

Figure 3A:
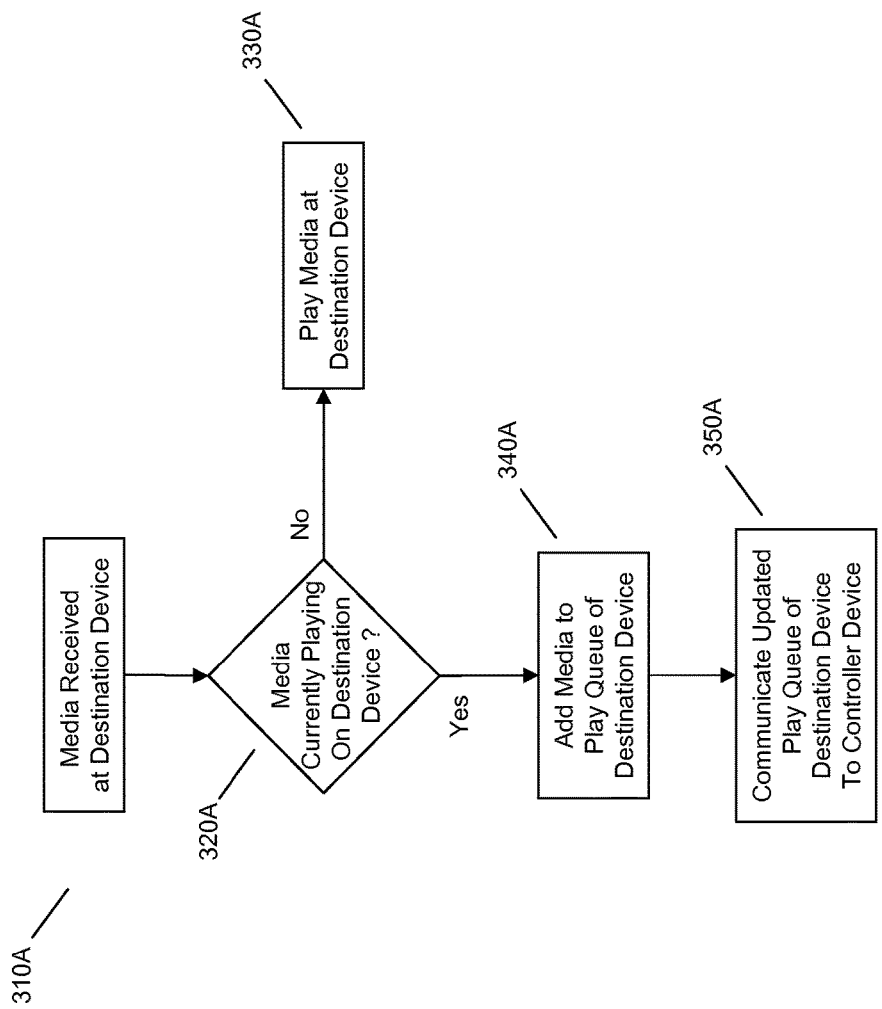
FIG. 3(A-B) illustrates example methods of appending playback from multiple sources to the same media stream.

Referring to FIG. 3A, an example method of appending playback from multiple source devices to the same media stream is illustrated. At 310A a play request (also referred to herein as "media") is received at a destination device. The play request may comprise an instruction for obtaining a media file, may comprise a media file, may comprise an override or other instruction, or a suitable combination of the foregoing. The received media/play request may for example comprise a media play request transmitted from another user device, either directly or through an intermediate device, such as a cloud computing device. The media may further comprise the actual media file, e.g., if the play request is directed to a media file not resident on the destination device. Thus, for example, a user may send media (e.g., a media play request and a media file) to the destination device, which is received at 310A. The connection between the sending or controller user device (e.g., tablet device of user "A") and the destination device (e.g., smart TV of user "B") may be managed via a cloud computing service, which intelligently manages communications between the devices, including authorizing the various devices to send or receive data and related requests/instructions, for example on the basis of associations between cloud computing accounts.

In an embodiment, the destination device manages its media stream such that the incoming play request does not necessarily disrupt/interrupt a currently playing media file. For example, at 320A the destination device determines if there is a currently playing media file. If not, the destination device may immediately begin processing the incoming request and playing the media associated therewith at 330A. However, if there is a determination that a media file is currently being played at 330A (or media is already queued to be played), then the destination device may simply modify the existing play queue to prevent interruption of the currently playing media file.

For example, the destination device may add or append the media file to the play queue of the destination device at 340A, for example adding a new media file to a play queue or playlist, the new media file being associated with the received media. Again, the received media may include the actual media file and/or an instruction for obtaining or otherwise accessing the new media file, even if the "new" media file is already resident on the destination device. Thus, the destination device will not interrupt the currently playing media file and the new media file corresponding to the received media will be added to the play queue in an appropriate manner. In this respect, the position chosen for the media addition to the play queue (e.g., the position within the play queue) may be managed in a variety of ways. For example, the destination device may independently assign a position to the new media file, for example in a last to be played position, or may position the media file as instructed, e.g., by another device (e.g., by the device sending the media received at 310A), etc.

Additionally, once the destination device has modified the play queue or playlist at 340A, the destination device may communicate this change to other user devices at 350A, for example to a controller user device (e.g., a user device that sent the media), and/or other user devices (e.g., as ascertained via a cloud account association). Thus, one or more additional user devices may be apprised of the current playlist or play queue information, including the currently playing media file, of the destination device, for example as modified by other user(s).

Figure 3B:
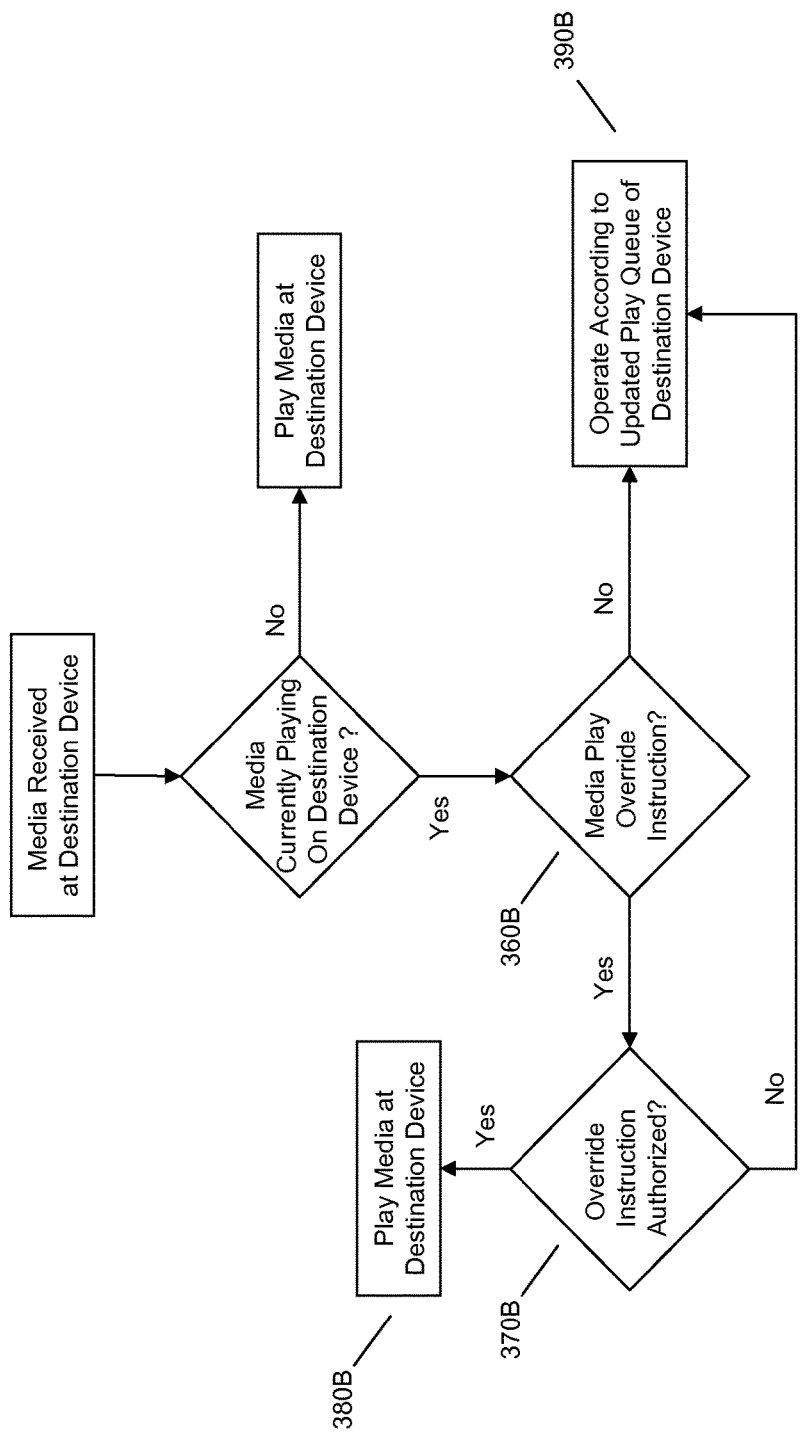

Referring to FIG. 3B, an embodiment permits received media (e.g., media play request and media file) to override a current state of the destination device such that the newly received media is prioritized, which may include taking priority in the play queue order of play list or even interrupting a currently playing media file at the destination device for immediate play. For example, when media is received at the destination device and it is determined that there is a currently playing media file, it may be determined by the destination device if there is included a media play override instruction in the received media at 360B.

The ability to issue a media play override instruction may be restricted, for example based on device authorization, such as for example via an association between devices via a cloud account service. The device authorization to issue effective media play override instructions may be managed via a cloud service in a similar way to managing connection and communication between the devices. For example, particular devices (e.g., the other devices of the owner of the destination device) may be preauthorized in the cloud service (e.g., in a cloud account) to issue effective media play override instructions that result in overriding a current media play state of the destination device. In this respect, the media play override instruction may be included in media sent from certain devices (e.g., user devices associated with the owner of a cloud account associated with the destination device).

Thus, if it is determined that a media play override instruction is included at 360B, if appropriate, as determined by checking if the device issuing the instruction is authorized at 370B, the play state of the destination device may be altered and the media of the request played immediately at 380B. As described herein, the media override instruction may include a different instruction, such as placing a particular media file at a particular position within the play queue or play list without disrupting/interrupting the currently playing media file. If no media play override instruction is included, as determined for example at 360B, or if the media play override is not effective (e.g., issued form an unauthorized device), as determined for example at 370B, then the current state of the destination device may not be altered over and above adding the new media to the play queue or play list, and the destination device continues playing the media files according to the updated play list or play queue at 390B. Therefore, the destination device may intelligently manage various play requests from various connected devices without interrupting or interfering with previously received media requests.

Accordingly, embodiments provide mechanisms for appending a play list in a multi-device play scenario. The various devices may be coordinated via a cloud service which acts to manage authorizations for the various devices, including the ability to modify the destination device's play state.

The various example embodiments have been described in connection with facilitating particular media data consumption as described using non-limiting examples. Embodiments may be used to provide similar functionality and services in other contexts and for many data types. In this regard, "media", "media file" and the like are used herein so as to be construed broadly to include not only visual media data and file types (such as images and videos), but other data, including music and/or audio data, word processing data, web based content, media requests and instructions, and the like. Similarly, although devices such as tablets, smart phones, laptops and television devices have been used in the description as specific examples, embodiments may be utilized in connection with other types of devices, for example, e-readers, desktop computers, kiosks, and the like.

It will also be understood that the various embodiments may be implemented in one or more information handling devices configured appropriately to execute program instructions consistent with the functionality of the embodiments as described herein. In this regard, FIG. 1 and FIG. 2 illustrate non-limiting examples of such devices and components thereof.

As will be appreciated by one skilled in the art, various aspects may be embodied as a system, method or computer program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device/computer readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving a play request at a first user device, the received play request being transmitted from at least one other user device and the received play request comprising instructions for obtaining a media file associated with the received play request, wherein communication between the first user device and the at least one other user device is managed by a third device based upon associations between the first user device and the at least one other user device within the third device;
ascertaining that the play request was issued from an authorized device, wherein the authorization of a device is managed by the third device and based upon associations between the first user device and the at least one other user device within the third device; and
updating the media play queue of the first device, without interrupting a currently playing media file and based upon the play request being issued from an authorized device, by appending, at the first user device, a media file associated with the received play request to a media play queue of the first user device;
wherein the appending further comprises adding the media file associated with the received play request to a position within the media play queue according to an instruction included in the play request, wherein the instruction included in the play request comprises an instruction to override the media play queue issued from a device having override authorization and wherein the override authorization is managed by the third device.

2. The method of claim 1, wherein the play request received at the first user device comprises a media file.

3. The method of claim 1, wherein the play request received at the first user device comprises information for locating a media file.

4. The method of claim 1, wherein the play request received at the first user device comprises a media play override instruction.

5. The method of claim 4, further comprising determining if the media play override instruction is effective via ascertaining if the media play override instruction was issued from an authorized device.

6. The method of claim 5, wherein the ascertaining if the media play override instruction was issued from an authorized device comprises ascertaining if a device issuing a media override instruction is authorized by a cloud account associated with the first user device.

7. The method of claim 1, wherein appending, at the first user device, a media file associated with the received play request to a media play queue of the first user device further comprises adding a media file to an end of the media play queue.

8. The method of claim 1, wherein the first user device comprises a device associated with a first cloud user account and the at least one other user device comprises a second user device associated with a second cloud user account.

9. The method of claim 8, wherein the at least one other user device comprises a third user device associated with a third cloud user account.

10. An information handling device, comprising:
one or more processors; and
a memory in operative connection with the one or more processors that stores instructions executable by the one or more processors to perform acts comprising:
receiving a play request at the information handling device, the received play request being transmitted from at least one other user device and the received play request comprising instructions for obtaining a media file associated with the received play request, wherein communication between the first user device and the at least one other user device is managed by a third device based upon associations between the first user device and the at least one other user device within the third device;

ascertaining that the play request was issued from an authorized device, wherein the authorization of a device is managed by the third device and based upon associations between the first user device and the at least one other user device within the third device; and updating the media play queue of the first device, without interrupting a currently playing media file and based upon the play request being issued from an authorized device, by appending, at the information handling device, a media file associated with the received play request to a media play queue of the information handling device;

wherein the appending further comprises adding the media file associated with the received play request to a position within the media play queue according to the priority characteristic, wherein the instruction included in the play request comprises an instruction to override the media play queue issued from a device having override authorization and wherein the override authorization is managed by the third device.

11. The information handling device of claim 10, wherein the play request received at the information handling device comprises a media file.

12. The information handling device of claim 10, wherein the play request received at the information handling device comprises information for locating a media file.

13. The information handling device of claim 10, wherein the play request received at the information handling device comprises a media play override instruction.

14. The information handling device of claim 13, wherein the acts further comprise determining if the media play override instruction is effective via ascertaining if the media play override instruction was issued from an authorized device.

15. The information handling device of claim 14, wherein the ascertaining if the media play override instruction was issued from an authorized device comprises ascertaining if a device issuing a media override instruction is authorized by a cloud account associated with the information handling device.

16. The information handling device of claim 10, wherein appending, at the information handling device, a media file associated with the received play request to a media play queue of the information handling device further comprises adding a media file to an end of the media play queue.

17. The method of claim 10, wherein the information handling device comprises a device associated with a first cloud user account and the at least one other user device comprises a second user device associated with a second cloud user account.

18. A program product, comprising:

a storage device having computer program code embodied therewith, the computer program code comprising:

computer program code that receives a play request at a first user device, the received play request being transmitted from at least one other user device and the received play request comprising instructions for obtaining a media file associated with the received play request, wherein communication between the first user device and the at least one other user device is managed by a third device based upon associations between the first user device and the at least one other user device within the third device;

computer program code that ascertains that the play request was issued from an authorized device, wherein the authorization of a device is managed by the third device and based upon associations between the first user device and the at least one other user device within the third device; and that updates the media play queue of the first device, without interrupting a currently playing media file and based upon the play request being issued from an authorized device, by appending, at the first user device, a media file associated with the received play request to a media play queue of the first user device;

wherein appending further comprises adding the media file associated with the received play request to a position within the media play queue according to instruction included in the play request, wherein the instruction included in the play request comprises an instruction to override the media play queue issued from a device having override authorization and wherein the override authorization is managed by the third device.

19. The method of claim 1, further comprising transmitting to at least one other user device an updated playlist based on the appending.

20. The information handling device of claim 10, wherein the acts further comprise transmitting to at least one other user device an updated playlist based on the appending.

* * * * *